United States Patent [19]
Robinson

[11] 3,708,900
[45] Jan. 9, 1973

[54] AERIAL SIGN
[76] Inventor: James G. Robinson, 2213 Oakwyn Road, Lafayette Hills, Pa. 19444
[22] Filed: April 6, 1971
[21] Appl. No.: 131,619

Related U.S. Application Data

[63] Continuation-in-part of Ser. No. 76,897, Sept. 30, 1970, which is a continuation-in-part of Ser. No. 763,358, Sept. 30, 1968, abandoned.

[52] U.S. Cl. .................................................. 40/212
[51] Int. Cl. ............................................... G09f 21/06
[58] Field of Search ...... 244/136; 40/129 C, 212, 215

[56] References Cited

UNITED STATES PATENTS

| | | | |
|---|---|---|---|
| 2,001,200 | 5/1935 | Knapp | 40/212 |
| 2,764,831 | 10/1956 | Main | 40/212 |

FOREIGN PATENTS OR APPLICATIONS

| | | | |
|---|---|---|---|
| 1,138,979 | 6/1957 | France | 40/212 |
| 486,441 | 6/1938 | Great Britain | 40/212 |

*Primary Examiner*—Robert W. Michell
*Assistant Examiner*—Wenceslao J. Contreras
*Attorney*—Seidel, Gonda & Goldhammer, Esqs.

[57] ABSTRACT

A sign for use with aircraft. The sign comprises an upper portion and a lower portion. The upper portion is mounted on the side of the aircraft and is disposed generally above the landing gear. The lower portion is pivotally supported beneath the aircraft on the opposite side of the landing gear and in close proximity to the upper portion. The lower portion can be raised to a horizontal position where it is positioned in a generally horizontal plane between the landing gear so that the aircraft can land. When the lower portion is in its display position, the fact that the two portions are not in the same vertical plane is not discernible to the ordinary observer. Thus, a continuous figure can be displayed on the upper and lower portions without any horizontal gaps in it.

5 Claims, 13 Drawing Figures

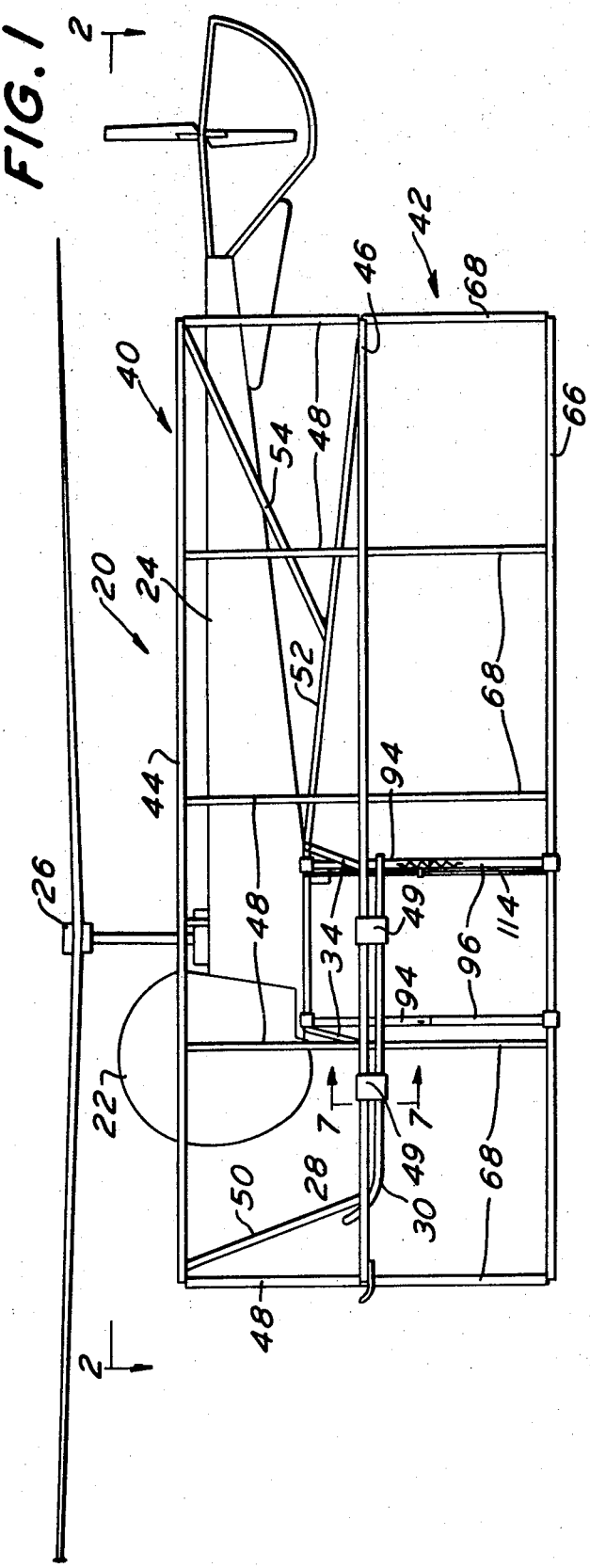

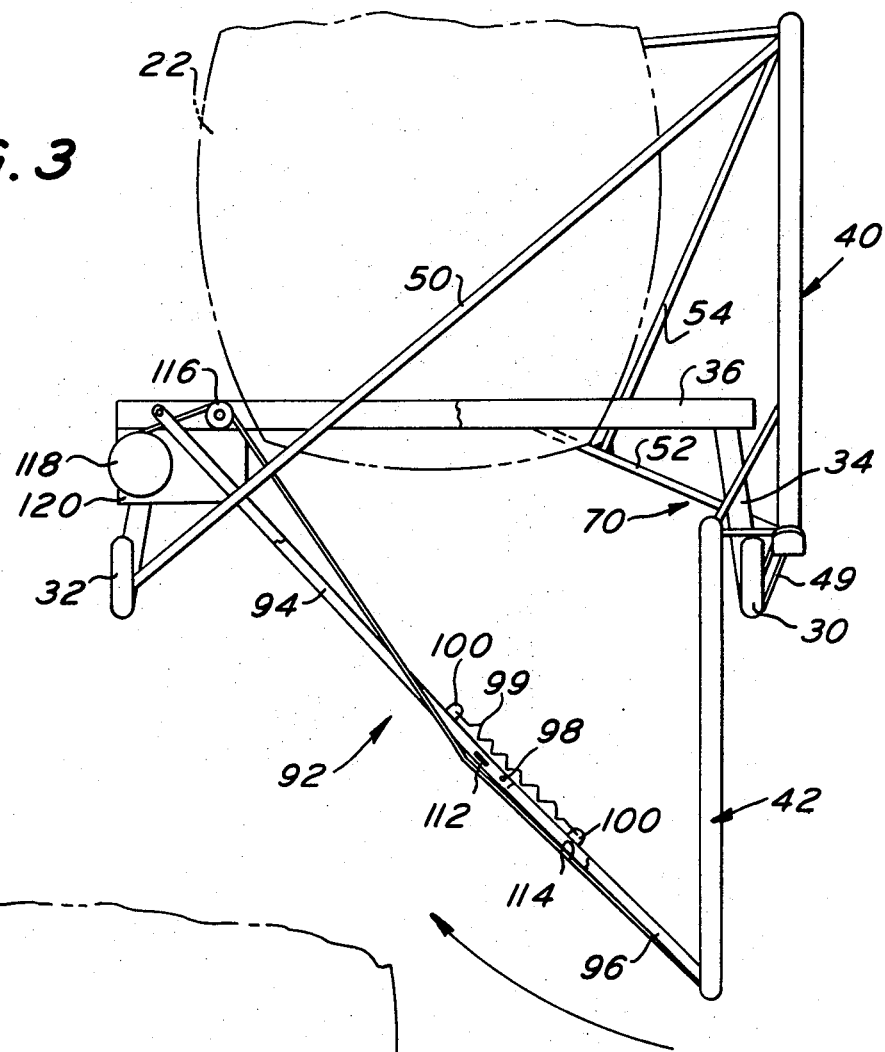
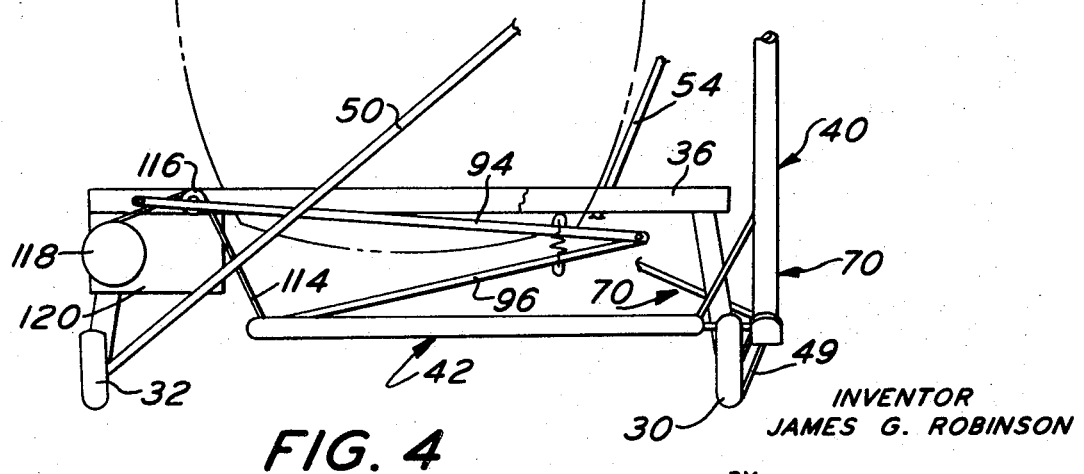

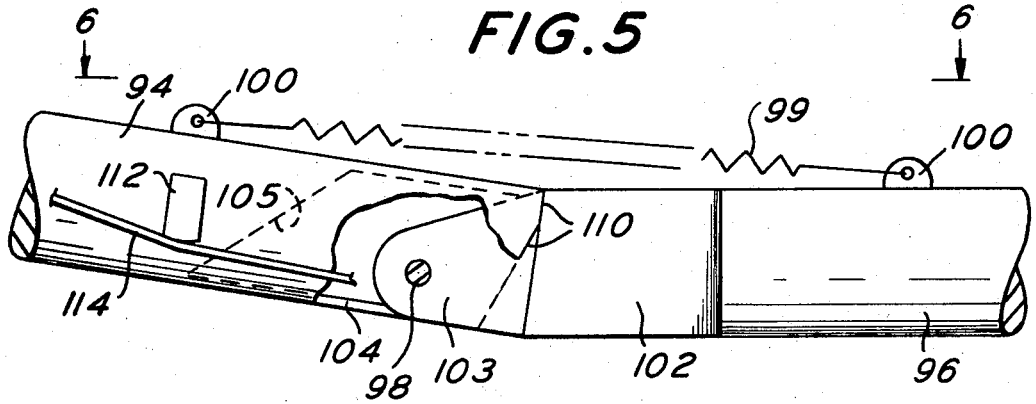
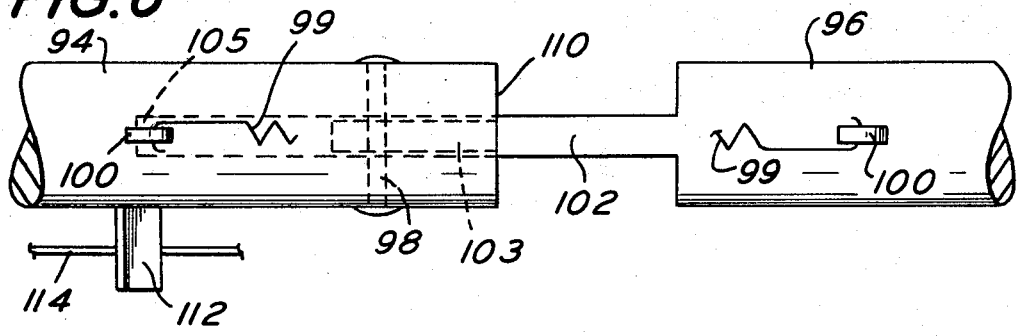
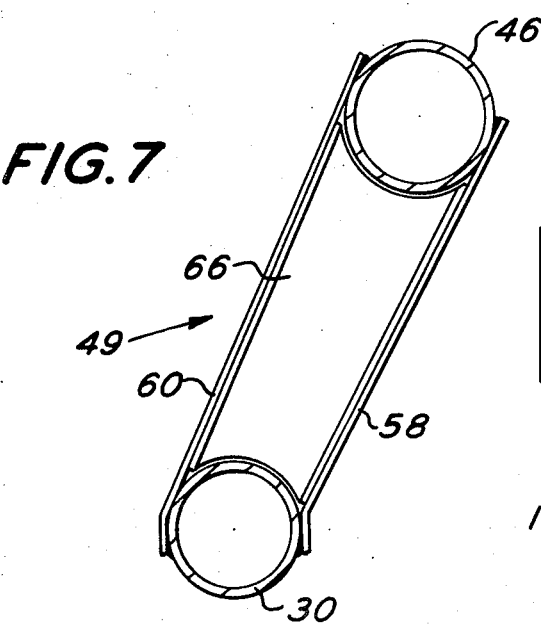
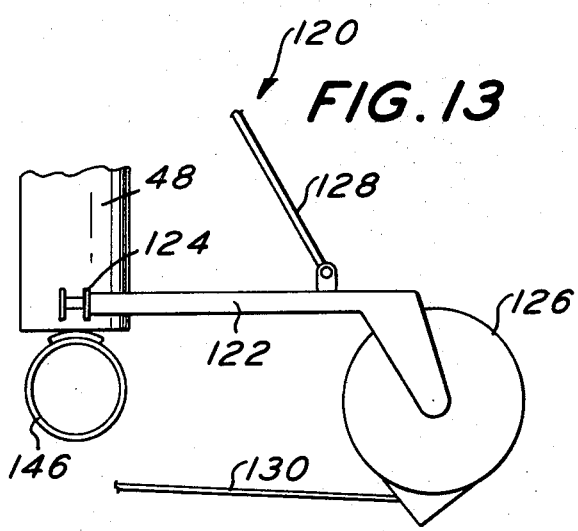
INVENTOR
JAMES G. ROBINSON

INVENTOR
JAMES G. ROBINSON 3,708,900

AERIAL SIGN

This patent application is a continuation-in-part of U.S. Pat. application Ser. No. 76,897 filed Sept. 30, 1970, which is a continuation-in-part of patent application Ser. No. 763,858 filed Sept. 30, 1968, and which is now abandoned.

This invention relates to aerial signs and more particularly to a sign to be mounted on an aircraft such as a helicopter.

The use of aerial display signs is well known. They have been mounted on conventional fixed wing aircraft such as monoplanes, biplanes and the like. Ordinarily, the signs take the form of banners with streamers trailing behind the aircraft or lighted panels mounted on the wings or fuselage.

There has been some developmental work done along the lines of mounting signs on helicopters. The advantage that a helicopter offers is the fact that its speed can be relatively slow in order to permit the maximum exposure in a given area.

Thus, helicopters carrying sings are known to a limited extent in the art. However, they are generally unsatisfactory because of the relatively small size of the sign which the helicopter may carry, and the difficulty associated with landing and taking off.

Accordingly, it is an object of this invention to provide a sign for a helicopter comprising upper and lower portions.

It is another object of this invention to provide a sign having upper and lower portions for a helicopter wherein the lower portion is normally positioned in depending relation to the helicopter but can be folded between the landing gear when the helicopter lands.

It is still another object of this invention to provide a helicopter having upper and lower sign portions which do not display a gap therebetween when the sign is in its display configuration.

In summary, the invention relates to a helicopter having a sign with upper and lower portions. The upper portion is supported on one side of the helicopter so that its bottom is disposed above the landing gear. The lower portion is pivotally mounted beneath the helicopter so that its top edge is adjacent the bottom edge of the upper portion although on the other side of the landing gear. The lower portion is movable between a first substantially vertical position where it depends from the helicopter in a display position and a second substantially horizontal position where it is disposed underneath the helicopter between the landing gear. Means are provided for moving the lower portion of the sign between first and second positions.

Other objects and advantages of the subject invention will be apparent from the following detailed description of the presently preferred embodiments thereof wherein FIG. 1 is a side elevation view of a helicopter carrying a sign in accordance with the presently preferred forms of the invention.

FIG. 2 is a sectional view of the helicopter taken along line 2—2 of FIG. 1.

FIG. 3 is a front elevational view of the helicopter of FIG. 1 showing latching means for the lower portion.

FIG. 4 is a view similar to 3, however, showing the lower portion of the sign in its collapsed position.

FIGS. 5 and 6 are detailed views of a portion of the latching means utilized in the configuration shown in FIGS. 3 and 4.

FIG. 7 is a sectional view taken along line 7—7 of FIG. 1.

FIG. 13 is a detailed view of the configuration of FIG. 8 showing the structure utilized in retaining the lower portion of the sign in its display position.

Figure 8:
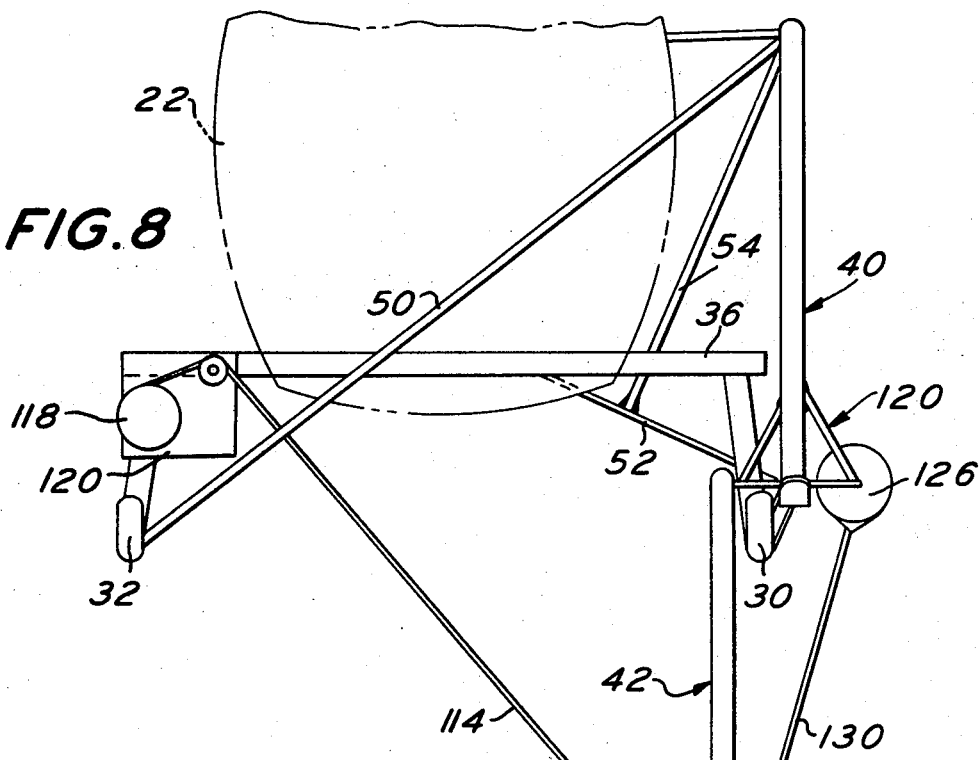
FIG. 8 is a view similar to FIG. 3 however, showing a different form of latching means for the lower portion.

Now referring to the drawings for a detailed description of the invention, an aircraft such as a helicopter 20 is shown in FIGS. 1 and 2. The helicopter includes a cockpit 22 connected to a tail boom 24 which carries a rotor 26 and landing gear 28.

As can be more clearly seen in FIGS. 2 and 3, the landing gear comprises skids 30 and 32 which are supported on opposite sides of the helicopter by vertical skid braces 34 and 35 on each side. The helicopter may be provided with any convenient type of landing gear such as wheels, skis or the like.

The vertical skid braces 34 and 35 are disposed on opposite sides of the helicopter and are interconnected by forward skid cross brace 36 and aft skid cross brace 38.

A sign comprising upper portion 40 and lower portion 42 is mounted on the aircraft.

The upper portion 40 includes an upper elongated member 44 which may be substantially as long as the aircraft and a lower elongated member 46 spaced therefrom. The upper and lower elongated members 44 and 46 are interconnected at spaced intervals by vertical members 48. Thus, the upper portion of the sign may have a generally rectangular elongated configuration as shown in FIG. 1.

The upper portion is supported on one side of the helicopter in part by brackets 49 which are connected to skid 30. The brackets, which are virtually identical are positioned in spaced relation along the skid so that they slope upwardly and outwardly. See FIGS. 3 and 7.

Additionally, the upper portion is supported by a plurality of braces. Thus forward brace 50 which may be a rod or bar is connected from approximately the juncture of the upper elongated member and the most forward vertical member 48 and slopes in a downwardly and rearwardly direction to skid 32. The rear portion of the sign is supported by aft lower brace 52 which runs from the juncture of the tail boom and skid cross brace 38 to the lower righthand corner of the upper portion as seen in FIG. 1. Aft upper brace 54 has one end connected to the aft lower brace 52 and has its other end connected to the upper righthand portion of the upper sign portion as seen in FIG. 1.

As seen in FIG. 7, each bracket 49 comprises a wedge-like like member 66 which is hollowed at its opposite ends to receive skid 30 and the lower elongated member 46. The skid and lower elongated member are retained against separation by straps 58 and 60 which are welded at their ends to the skid and the lower elongated member.

Thus, as seen in FIGS. 1 and 2, it is preferred that at least two brackets 49 be provided. However, in view of the additional supporting structure that is utilized, any number of brackets can successfully be used.

Lower portion 42 is constructed in substantially the same manner as the upper portion. Thus, it includes an upper elongated member 64 which is hidden from view in FIG. 1 but can be seen in FIG. 2. It may also include a lower elongated member 66. Both the upper and lower elongated members are connected by a plurality of vertical braces 68 which are disposed in spaced relation therebetween. Thus, the lower portion may have a generally rectangular configuration similar to that of the upper portion.

As is apparent, the optimum configuration for the upper and lower portions of the sign is preferably rectangular as illustrated in FIG. 1 to take advantage of the configuration of the helicopter. However, it is apparent that many other shapes and configurations could also be utilized.

An obstacle to the two portion sign configuration has been the gap between the upper and lower portions of the sign. Thus, when any large continuous figure such as a circle, a bottle or any other design is displayed on the sign, it is shown to be clearly cut in half at the separation between the upper and lower portions.

However, in the present invention the lower portion of the sign is mounted inboard of skid 30 so that its upper elongated member 64 is in substantially horizontal alignment with lower elongated member 46 of the upper portion. Thus, when observed from the normal viewing distance of about ¼ to ½ mile and at an altitude of about 500 feet, the lack of vertical alignment between the upper and lower portions of the sign is virtually unnoticeable.

This in part follows from the fact that in accordance with the present construction, the horizontal distance between the two portions is in the range of about 8 to 15 inches. This distance is virtually unnoticeable under the aforementioned viewing conditions.

A preferred manner of supporting the lower portion so that it is movable into and out of its display position is shown in FIGS. 1-3 and 10-13.

As seen in FIG. 2, the lower portion of the sign is supported at four points, namely, 70, 71, 72 and 73.

The lower portion is pivotally connected to the helicopter at each of these supports. All of the pivotal connections are in linear alignment so that the lower portion can swing into the position illustrated in FIGS. 4 and 9. Thus, supports 70 and 73 are disposed forward and aft of skid 30. As shown in FIG. 3 schematically, support 70 which is identical to support 73 includes a bracket which is supported by the upper portion and is directed inboard of skid 30.

Figure 10:
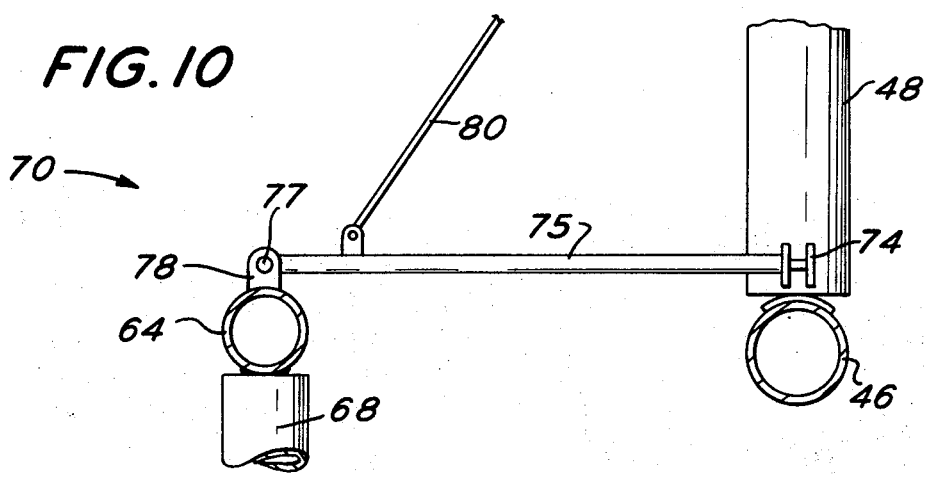
FIGS. 10, 11 and 12 are detailed views showing the hinge connections between the upper and lower portions.

A detail of support 70 is best seen in FIG. 10.

In that figure, a support fitting 74 is fixed adjacent the juncture of lower elongated member 46 and vertical member 48. The support fitting carries a horizontally extending brace 75 which projects inboard of the skid (FIG. 3) and is pivotally connected by a pin 77 to an ear 78. The ear is fixed to upper elongated member 64 on the lower portion of the sign. Thus, pin 77 serves as one of the pivot points for the lower portion. An angle brace 80 running between horizontal bracket 75 and vertical member 48 functions to add rigidity and strength to the supporting structure for the lower sign.

It should be noted that the configuration shown in FIG. 10 is representative of the supporting structure for the lower portion at supports 70 and 73.

Figure 11:
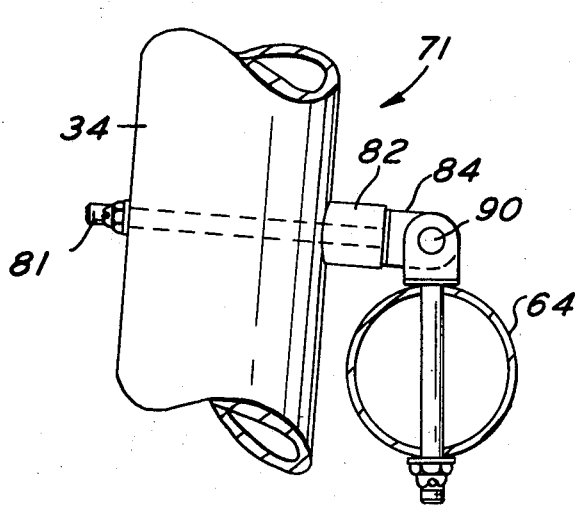
Figure 12:
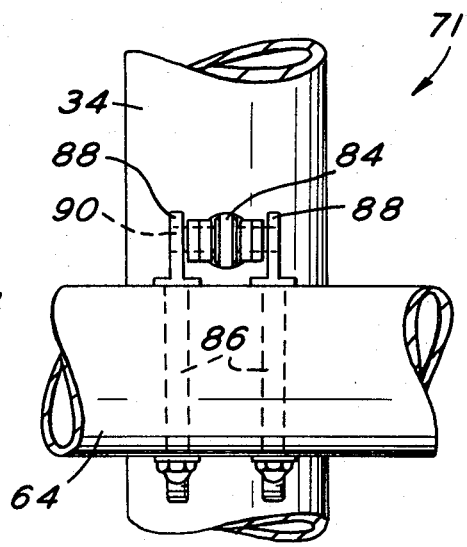

The supporting structure at support points 71 and 72 in FIG. 2 is illustrated more particularly in FIGS. 11 and 12. Thus, support point 71 will be described, it being understood that support point 72 is identical.

In FIG. 11 vertical skid brace 34 carries a threaded shaft 81 which supports a base 82 against the brace. The base carries an ear 84. In like manner, the upper elongated member 64 of the lower portion carries two threaded shafts 86, each of which support ears 88 on opposite sides of aforementioned ear 84. The ears 88 and 84 may be separated by suitable spacers and are connected by a pin 90 to provide a pivotal relation therebetween. As indicated above, pins 90 are in alignment with pins 77 so that an axis of rotation for the lower portion is defined.

One form of arrangement for moving the lower portion to and holding it in its display position is illustrated in FIGS. 3 and 4. Thus, as illustrated in FIG. 3, an over-the-center mechanism 92 is provided. The mechanism includes a first bar 94 having one end pivotally connected to skid cross brace 36. Second bar 96 has one end connected to elongated lower member 66 on the lower portion. The bars 94 and 96 are pivotally interconnected by a pin 98. They are urged into the over-the-center relationship by a suitable resilient member such as helical tension spring 99. The spring may be mounted on suitable supports 100.

As seen in FIGS. 5 and 6, bar 96 may include an elongated tongue 102 having an ear 103 which projects outwardly and into a slot 104 in bar 94. As seen in FIG. 5 the slot is in the bottom of bar 104 and its rear wall 105 slopes upwardly and toward bar 96.

Ear 103 is retained in the slot by pin 98. Thus, as seen in FIG. 5, bars 94 and 96 are forced into a generally V configuration by spring 99. In this configuration bearing contact is made along the juncture 110 defined by the intersection of the two bars.

A break block 112 is supported by bar 94 so that it projects laterally therefrom. The block may be an elongated member which engages the retraction cable 114 as will be explained herein.

Cable 114 is fixed at one end to the lower elongated member 66 of the lower portion of the sign (FIG. 3). It is entrained over the break block 112 as explained above, then over pulley 116 and wrapped about winch 118. The winch is driven by a suitable electric motor 120 which is mounted on the landing gear adjacent skid cross brace 36.

Normally the lower sign is disposed horizontally in the position shown in FIG. 4 so that the helicopter can take off and land. In this configuration, the winch 118 has wound cable 114 tight and the over-the-center mechanism has been broken and is disposed in the position shown.

When the winch is disengaged, the sign is lowered under its own weight to the position shown in FIG. 3. As the sign reaches a substantially vertical configuration, spring 99 snaps bars 94 and 96 into their over-the-center position. In this arrangement, the sign is held rigidly in position.

In order to retract the sign, winch 118 is energized to reel cable 114. As explained above, the cable is entrained about break block 112. Thus, as the cable tightens about break block 112, it tends to overcome the force of spring 99 and break the lock thereby permitting the sign to be brought to its collapsed position.

Figure 9:
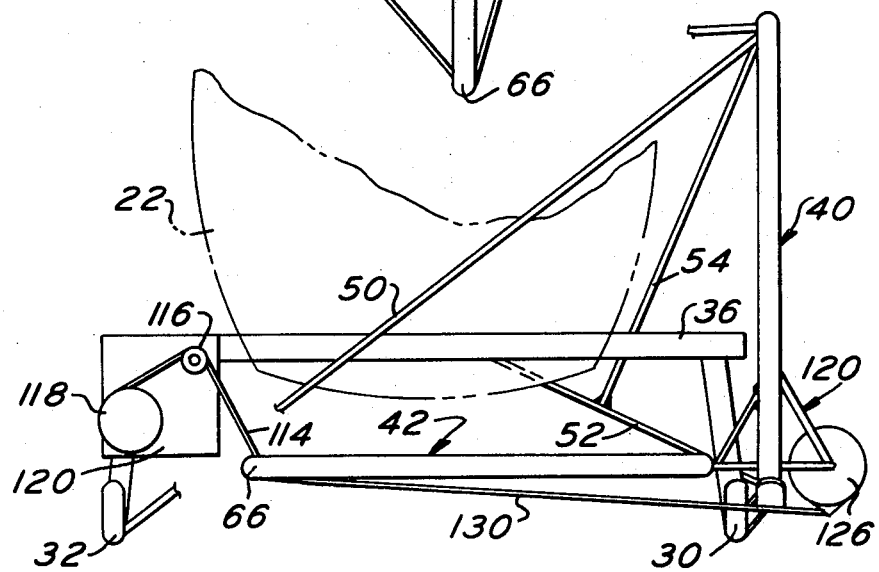
FIG. 9 is a view similar to FIG. 8, however, showing the lower portion of the sign in its collapsed position.

A second configuration for raising and lowering the lower portion and holding it in its display position is shown in FIGS. 8, 9 and 13.

In that configuration, at least one, but preferably two braces 120 are disposed outboard of the upper sign along it length. These braces, are similar in construction to the supports 70 and 73 for the lower sign and are shown in detail in FIG. 13. Thus, each of the braces 120 includes a laterally extending member 122 which is carried by one of the vertical members 48 of the upper sign adjacent its juncture with lower elongated member 46. The laterally extending member 122 is supported at one end by a fitting 124. At its other end it carries a suitable spring tension reel 126.

The laterally extending member 122 is supported at its outboard end at 130 by one end of an angled member 128. The other end of the angled member is connected to vertical member 48. Thus, members 122 and 128 tend to rigidly support the spring reel 126 outboard of the upper sign. A cable 130 is connected from the spring reel to member 66 in the lower portion.

There may be a plurality of supporting structures 120 disposed along the length of the sign.

As illustrated in FIGS. 8 and 9, the spring reels 126 are substituted for the over-the-center locking mechanisms shown in FIGS. 3 and 4.

The configuration of the sign shown in FIGS. 8 and 9 functions in substantially the same way as that which has been described in connection with FIGS. 3 and 4.

Thus, the sign is normally disposed in the position illustrated in FIG. 9 where it is horizontally positioned well above the bottom portion of the skids. This permits the aircraft to land and take off with a maximum degree of freedom. While in this configuration, cable 114 which runs from the lower portion of the lower sign 66 to aforementioned winch 118 is reeled. On the other hand, cable 130 running from spring reel 126 is extended to its maximum position. Preferably, the spring reels 126 are comprised of constant force springs which are capable of providing a uniform load on the cable without regard to the extent to which they are wound or unwound.

When winch 118 is disengaged, the lower portion 42 falls to the vertical display position under its own weight. As it approaches the vertical position, the spring reels 126 urge it into the position shown in FIG. 8 and hold it there. Since it is contemplated that a plurality of such spring reels will be utilized along the length of the sign they are sufficient to hold it in the vertical position.

In order to collapse the sign it is merely necessary to energize winch 118 to reel cable 114. Thus, the winch will overcome the force of the spring reels and cause the sign to collapse to the position shown in FIG. 9.

In the claims appended hereto by the term "landing gear" it is meant the portion thereof which comes in contact with the ground or other landing surface.

While the invention has been described with reference to a number of forms and embodiments thereof it is apparent that many other forms and embodiments thereof will be apparent to those skilled in the art in view of the foregoing specification and drawings. Thus the scope of the invention should not be limited thereby but rather should be defined only by the scope of the claims appended hereto.

I claim:

1. A helicopter having oppositely positioned landing gear members and a sign, said sign including upper and lower portions, said upper portion including a lower elongated edge, means for supporting said upper portion on one side of said helicopter so that said lower elongated edge is disposed above said landing gear, said lower portion including an upper elongated edge, means for pivotally supporting said lower portion beneath said helicopter with said upper and lower elongated edges in substantially side by side relation with respect to each other and with one of said oppositely positioned landing gear members disposed therebetween, said lower portion being movable between a first substantially vertical display position where it depends from said helicopter and a second substantially horizontal position where it is disposed between said oppositely positioned landing gear, and means for moving said lower portion between said first and second positions.

2. A helicopter as defined in claim 1 wherein said means for pivotally supporting said lower portion includes brace means supported by said upper portion and extending between said landing gear members.

3. A helicopter as defined in claim 1 wherein said means for moving said lower portion to said second position comprises resiliently biased members, said members being supported outboard of said pivotal support, and elongated means connected between said lower portion and said resiliently biased means for urging said lower portion to said second position.

4. A helicopter as defined in claim 1 including means for retaining said lower portion in said first position, said retaining means including over-the-center locking means comprised of a first elongated bar having one end pivotally mounted to said helicopter and a second elongated bar having one end pivotally mounted to said lower portion, the free ends of said first and second bars being pivotally interconnected, and yieldable means interconnected between said bars for yieldably retaining said locking means in its over-the-center position.

5. helicopter as defined in claim 4 wherein one of said bars is provided with a laterally projecting member adjacent said pivotal interconnection, said means for moving said lower portion comprising cable means having one end coupled to said lower portion adjacent said second bar, its other end connected to reel means, and its intermediate portion being entrained over said laterally projecting member to break said lock when said lower portion is moved to its second position.

* * * * *